Jan. 31, 1961  W. M. SNYDER ET AL  2,969,673
RODMETER
Filed Dec. 17, 1956  3 Sheets-Sheet 1
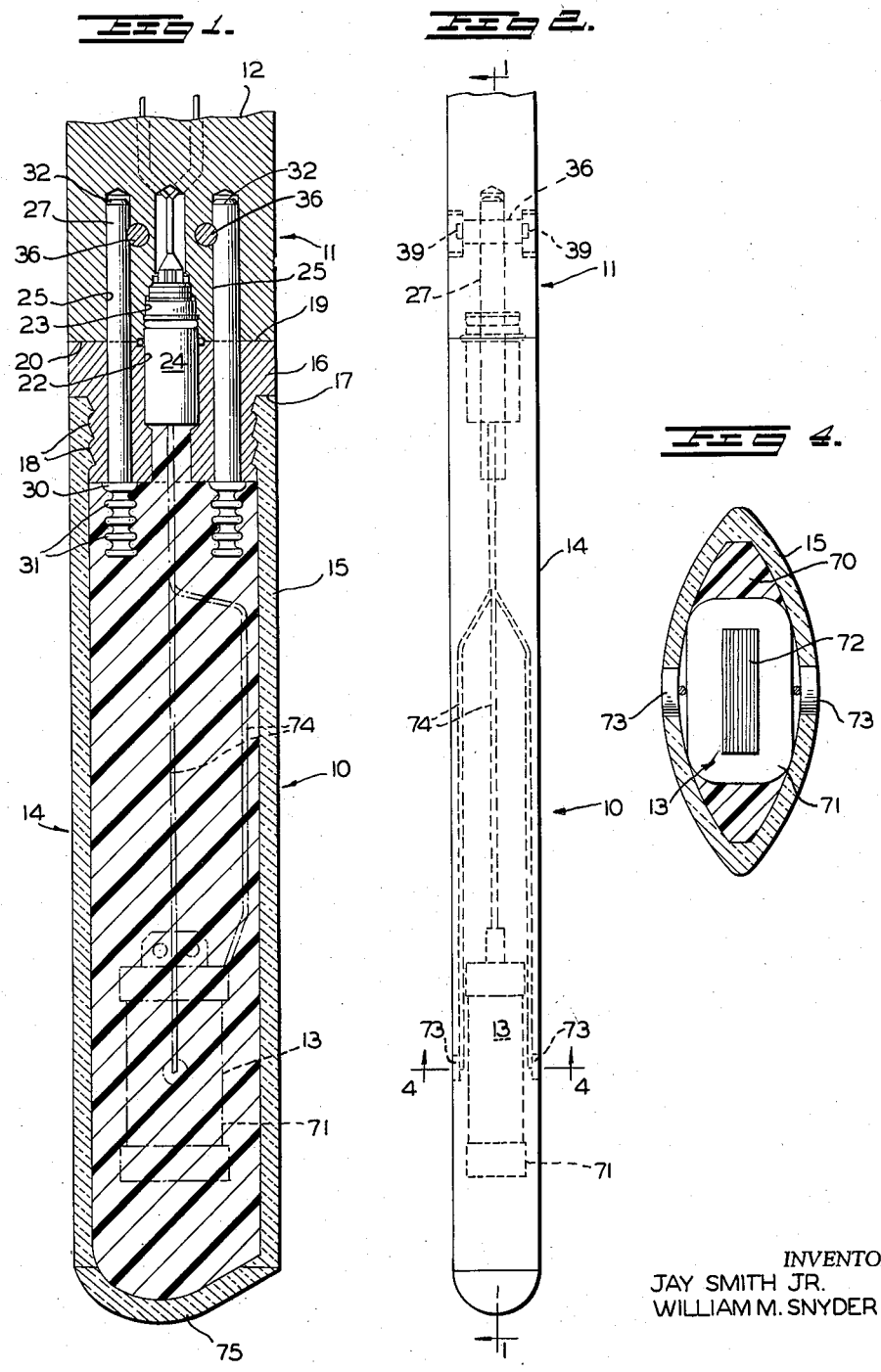
INVENTORS
JAY SMITH JR.
WILLIAM M. SNYDER
BY
B. L. Zangwill
ATTORNEY

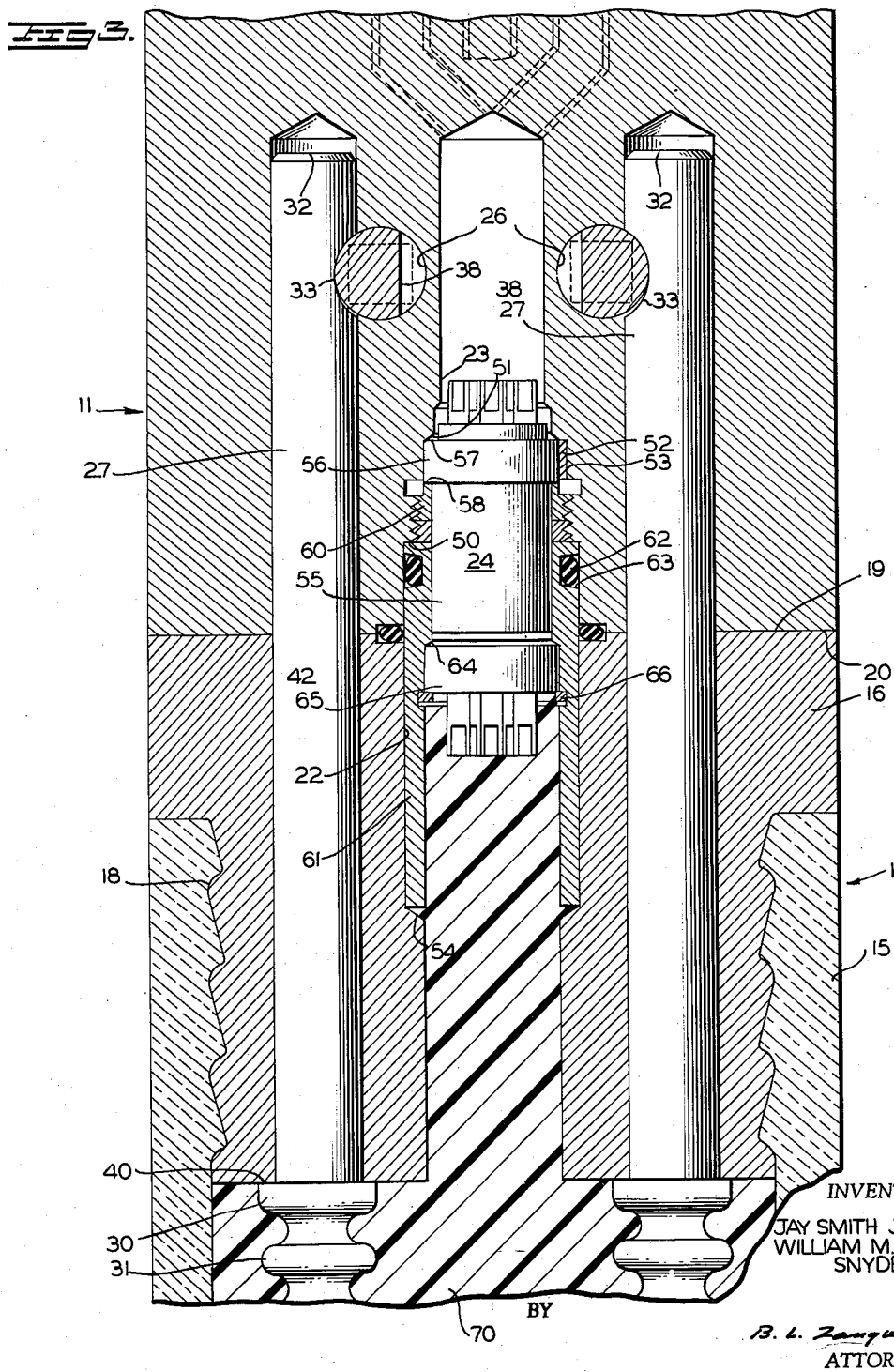

Jan. 31, 1961 W. M. SNYDER ET AL 2,969,673
RODMETER
Filed Dec. 17, 1956 3 Sheets-Sheet 3
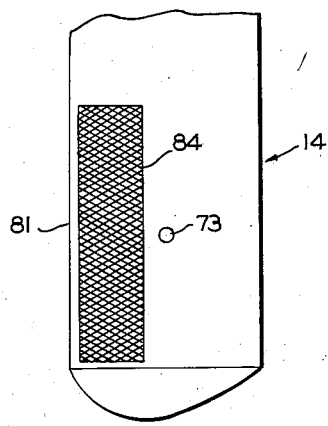
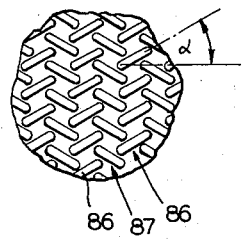
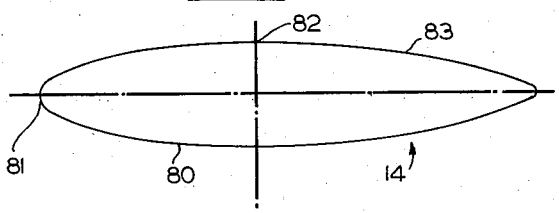
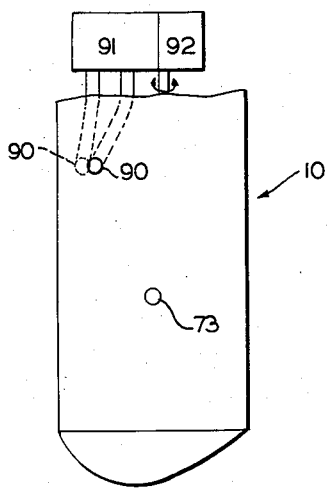
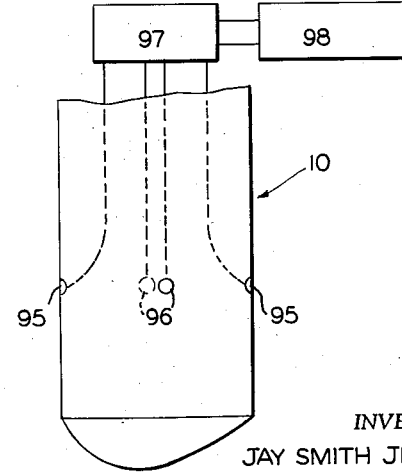
INVENTORS
JAY SMITH JR.
WILLIAM M. SNYDER
BY
B. L. Zanquill
ATTORNEY

United States Patent Office 2,969,673
Patented Jan. 31, 1961

2,969,673

RODMETER

William M. Snyder, Kensington, and Jay Smith, Jr., Silver Spring, Md., assignors to the United States of America as represented by the Secretary of the Navy Filed Dec. 17, 1956, Ser. No. 628,942

3 Claims. (Cl. 73—194)

(Granted under Title 35, U.S. Code (1952), sec. 266)

The invention described herein may be manufactured and used by or for the Government of the United States of America for governmental purposes without the payment of any royalties thereon or therefor.

This invention relates to an improved rodmeter of the type described in patent application Serial No. 588,203, filed May 29, 1956 to which reference may be made.

The present invention has for an object the provisions of a rodmeter which is of simple design, which is easily constructed, and which is so physically and hydrodynamically constructed as to minimize the type of errors that require constant changes in calibration and the type of errors that make accurate calibration over the operating range of speeds impossible.

Briefly, a rodmeter of the type to which the invention relates comprises a rodmeter or a strut that is part of a means for indicating the speed of a ship. The strut is immersed in the relatively moving water and comprises an electromagnet insulated from the water and two spaced electrodes contacting the water. The electromagnet produces an alternating magnetic field in a zone of water surrounding it. The water flowing by the strut acts as a conductor as it passes through the magnetic field, so that a voltage is induced in the water in the vicinity of the electromagnet. This voltage is proportional to the relative speed of the strut through the water. The voltage appears across the electrodes; and circuitry is utilized to use the detected voltage to actuate an indicator calibrated to read the relative speed of the ship hull with respect to the body of water supporting it.

Experience has shown that rodmeters constructed with the "non-magnetic" metals of the prior-art developed a zero drift in calibration after a few hours in use. This drift is in the range of from ±0.1 knot to ±0.3 knot, and is more than the desired calibration of the electromagnetic log to within a desired ±0.1 knot.

While the true cause of this zero drift cannot be explained with certainty, it is believed that it arises in part at least from the fact that the Curie points of the "non-magnetic" metals employed in the construction of the prior-art struts may be in the range of operating temperatures of the rodmeter, as a result of which their magnetic characteristics change, giving rise to eddy currents and changed field distributions. The most common nickel alloy used for rodmeters of the prior-art is "non-magnetic" Monel. Struts of this metal quickly acquire relatively nonconducting nickel oxide coatings on their surfaces which are readily abraded off by abrasion of water flow. The changed physical characteristics and dimensions of the strut lower its electrical resistance to induced currents and change the electric field distribution. It is also thought that the presence of the metal strut in the vicinity of the electromagnet coil causes the flux in the water to be displaced in phase with respect to the current in the coil, causing some of the speed signal to be seen as transformer or quadrature voltages which are rejected in the measuring circuits. The above described variable nonlinearities arising from the materials used in conventional rodmeters produce errors in the calibrating circuit of the electromagnet log that are not compensated for.

Another disadvantage of the prior-art rodmeters is that their designs introduce another type of error at certain speeds which cannot be eliminated by calibration. The accuracy of speed indications with respect to ship's speed through the water, therefore, is dependent not only on the boundary layer about the ship but also on the flow conditions in the vicinity of the pickup which is dependent upon the hydrodynamic characteristics of the rodmeter in the vicinity of the pickup electrodes.

It is recognized in the aforementioned prior patent application that there is a non-linear relationship between indicated speed and the ship's speed relative to the large body of water supporting the ship. This is due not only to the fact that measurements are, for practical purposes, limited to a region within the boundary layer of the ship but also to the fact that the flow or speed of the water in the immediate vicinity of the electrodes introduce another boundary layer. The latter is due to the fact that the equipment is dependent for its signal on the velocity of a volume (a few cubic inches) of water in the immediate neighborhood of the electrodes. This is true because the magnetic field produced by the electromagnet is limited in extent and the flux density varies inversely as a function of distance from the source. Any variation of the relative flow within this region, with respect to time, will be reflected as a change in the indicated speed if the duration of the variation is greater than the response time of the measuring circuit. Where fluctuations in velocity about the sensing electrodes are rapid and continuing and their periods are less than the response time of the measuring circuits, the indicating instrument will read average velocities.

The average velocity of the flow of water past the electrodes does not vary linearly with the velocity of the rodmeter with respect to free water, and consequently the microvolts/knot ratio is not constant. Under certain conditions this non-linearity could be taken into consideration in the calibrating circuit. However, experience has shown that over the whole operating speed range of a ship, the microvolts/knot ratio of its rodmeter deviates very sharply from the average at certain speeds and cannot be readily compensated for in the circuitry of the speed indicating equipment. These large abrupt deviations from the average microvolts/knot ratio are attributable to the hydrodynamic characteristics of the rodmeter. Fluid flow past a solid body is characterized by one of two conditions, laminar flow or turbulent flow. For a given body in a given fluid, the type of flow which will exist is dependent on the relative velocity between the body and fluid. At low velocities, viscous forces predominate which result in laminar flow in which the fluid moves in layers. At some higher velocity, inertia forces will predominate resulting in turbulent flow in which secondary irregular motions and velocity fluctuations are superimposed on the principle or average flow. Between these two conditions lies a transition region. The velocity at which this flow transition occurs is in part a function of fluid characteristics, the surface roughness of the solid and the shape of the solid. In tests, it has been found that up to a certain speed, flow is laminar. Thereafter as speed is increased a transition from laminar to turbulent flow takes place. Thereafter, flow is turbulent until cavitation starts. During the transition period the microvolts/knot ratio, deviates very sharply and abruptly from a smooth curve.

The invention seeks to provide a rodmeter which reduces abrupt flow nonlinearities. It does this by stimulating the onset of boundary layer transition at lower speeds, maintaining the point of transition from laminar to turbulent flow fixed with respect to the leading edge of the strut, and, delaying the onset of cavitation to speeds greater than the expected maximum operating speeds of the rodmeter. By reducing the transition to lower speeds, the abrupt changes in the microvolts/knot ratio are smoothed out and spread over a greater range of speeds, thereby enabling the error correction to be made on more calibrating dials and in smaller amounts.

In the instant invention, the disadvantages attributable to materials employed in the prior-art rodmeters are minimized by employing a rodmeter constructed of plastics. The novel plastic construction enables zero drift to be substantially eliminated. Further the rodmeter of the instant inventions embodies hydrodynamic designs which enable accurate calibration over a wide range of operating speeds by spreading nonlinearities due to relative water flow over the whole range of operation.

It is an object of the invention therefore to provide an improved electromagnetic sensing unit.

It is a further object of this invention to provide an improved rodmeter wherein zero drift is minimized thereby enabling accurate measurements of speed to within ±0.1 knot.

It is another object of the invention to provide a rodmeter having a surface impervious to water and chemical change whereby flow characteristic thereover will remain unchanged over long periods of time.

It is a still further object of the invention to provide a rodmeter constructed from plastic non-magnetic materials whereby the flux set up in the water is unaffected by eddy currents thereby rendering the flux substantially in phase with the exciting current.

Still another object is the provision of a rodmeter having a profile such that the region of boundary layer transition from laminar to turbulent flow in the vicinity of the sensing electrodes thereof remains fixed with respect to the leading edge of the rodmeter at all speeds.

Another object of the invention is the provision of a rodmeter so constructed that it is able to maintain a stable and linear calibration curve.

Still another object is the provision of a rodmeter having a configuration such that significant cavitation does not occur within the operating speed range of the rodmeter.

It is a further object of the invention to provide a rodmeter having a length to width ratio whereby vibration within the operating ranges of speed is minimized.

Other objects and many of the attendant advantages of this invention will be readily appreciated as the same becomes better understood by reference to the following detailed description when considered in connection with the accompanying drawings wherein:

Fig. 1 is a cross sectional view to scale, of the rodmeter of the instant invention taken along line 1—1 of Fig. 2;

Fig. 2 is a front elevation of the rodmeter of Fig. 1;

Fig. 3 is a detailed sectional view of a portion of the rodmeter of Fig. 1;

Fig. 4 is a cross sectional view of the rodmeter taken along line 4—4 of Fig. 2;

Fig. 5 is an elevational view of a 6 inch (edge to edge) rodmeter strut drawn to a scale of 1″=4″, having a roughened surface adjacent the leading edges and in the vicinity of the electrodes;

Fig. 6 shows a preferred cross sectional profile of the strut of Fig. 5, drawn approximately to a scale of 1″=2″;

Fig. 7 shows an exploded view of a portion of the roughened area of Fig. 5;

Fig. 8 shows a rodmeter including means for positioning the rodmeter in line with maximum flow.

Fig. 9 shows an alternative method of measuring speeds in line with maximum flow.

Referring now to the drawings, wherein like reference characters designate like or corresponding parts throughout the several views, there is shown in Figs. 1–4 a rodmeter, generally designated by reference 10, secured to a coupling device generally designated by reference 11. The coupling device is adapted to be secured at its upper end 12 to and depend from a carrier or ship through a suitable valve or the like. The coupling device 11 is constructed of non-magnetic material and in one embodiment bronze was found suitable.

The rodmeter 10 comprises an electromagnetic sensing unit 13 within a strut 14, which has an outer elongated casing 15. The casing, in one embodiment, is substantially oval shaped in cross section (Fig. 4) and is fabricated, as by moulding on a mandrel, from a polyester fibre glass laminate or from any other plastic which may be similarily formed to be fluid impervious and chemically inert. The upper part of the strut 14 comprises an adapter 16 having an undercut portion 17 whose surface has formed thereon a plurality of undulations 18 about its periphery. The adapter 16 also serves during fabrication as part of the mandrel whereby the upper portion of the interior of the plastic casing 15 conforms to said undulations 18 to make a secure watertight joint between the casing 15 and adapter 16.

The lower end surface 19 of the coupling device 11 and the upper end surface 20 of the adapter 16 are designed to abut one another and to be mechanically and electrically secured together at the abutting surfaces in watertight relationship. In order to obtain this secured watertight relationship between the adapter 16 and coupling device 11, each is provided respectively with relatively large aligned cylindrical bores 22 and 23 of varying diameter adapted to contain the electrical connectors 24. Each is also provided with two aligned smaller cylindrical bores 25 of constant diameter; all having their centers on the major axis of the oval shaped strut 14. The coupling device 11 is also provided with a pair of cylindrical bores 26 (Fig. 3) transverse to, though displaced from the axis of the bores 25 in the coupling device. A pair of non-magnetic metallic tie rods 27 are placed within the aligned two smaller bores 25. The tie rods 27 are provided with enlarged lower ends 30 having formed thereon, similar to forms taken by electric power insulators, a plurality of circumferential undulations 31. Adjacent the other ends 32, the tie rods 27 have cylindrical transverse cutouts 33, which cutouts, when the tie rods are in place, are adapted to align with the off center transverse bores 26 in the coupling device 11. The tie rods are secured in the position shown by a pair of locking pins 36 inserted within the transverse bores 26. As is more clearly seen in Fig. 3 the locking pins are also provided with cylindrical cutouts 38 midway between their ends 39 whereby turning the locking pins 180° from the position shown allows the tie rods to be removed from coupling device 11. The locking pins thereby hold the tie rods fixed against either rotational or longitudinal movement in the position shown. It may be seen therefore that by so securing the tie rods 27 at both ends i.e. the locking pins 36 at one end and the shoulder 40 formed by the enlarged end 30 of the tie rods 27 at the other, and providing an O-ring seal 42 between the abutting surfaces of the adapter and coupling device, that a secure mechanical and watertight joint is provided.

In one embodiment the coupling device and the adapter were constructed of non-magnetic metals e.g. bronze. However it is within the contemplation of the invention that both may be formed of plastic materials or a non-magnetic metal boot filled with a suitable plastic compound.

As may be seen clearly from Fig. 3, the relatively large varying diameter bore 23 in the coupling device 11 is formed of three different diameters decreasing in size from the abutting end surface 19 of the coupling device, thereby forming a horizontal shoulder 50 and a beveled shoulder 51. The intermediate diameter between shoulder 50 and 51 is partially threaded and is also provided with a key 52 projecting from the wall 53 thereof for reasons to be disclosed. The relatively large varying diameter bore 22 in the adapter 16 is comprised of two different internal diameters decreasing from said abutting end surface 20 of the adapter 16 forming shoulder 54.

Still referring to Fig. 3, the electrical connection 24 between the coupling device 11 and the adapter 16 will be described as assembled within the aligned central bores 22 and 23 thereof. The connection comprises a female connector 55 inserted within the bore 23 in the coupling device 11 having an upper section 56 of enlarged diameter, thereby forming shoulders 57 and 58. The shoulder 57 thereof abuts the shoulder 51 in the coupling members bore 23. A keyway is also provided in the enlarged section 56 which cooperates with key 52 to prevent rotation of the female connector 55. Thereafter an externally threaded hollow cylindrical retainer ring 60 adapted to fit about the female connector is screwed into the threaded part of bore 23 until it abuts the shoulder 58 formed by the enlarged section 56 of the female connector 55 thereby holding the female connector fixed. A hollow cylindrical shield 61 extending in a press fit within the bores 23 and 22 of both the coupling device and the adapter is held against longitudinal movement between shoulder 50 of the former and shoulder 54 of the latter. An O-ring 62 provided in a circumferential slot 63 cut in the outer periphery of the shield 61 provides a further fluid tight seal. The internal diameters of the shield are such as to form a shoulder 64 in the vicinity of the abutting surfaces 19 and 20 whereby a male connector 65 may be inserted in the bore of the shield in abutting relationship with the shoulder 64 therein and held within the shield and in electrical connection with the female connector by a snap-ring 66 or the like.

In accordance with the invention, after the above described assembly has been accomplished, the interior of the casing 15 is then filled with a suitable plastic plotting compound e.g., a glass filled epoxy pole-casted resin 70. The plastic fill grips the undulations 31 on the enlarged ends 30 of the tie rods 27 to anchor them and thereby form a more secure strut by strengthening the adapter and coupling connection. The plastic fill also serves to maintain the sensing unit 13 which comprises (Fig. 4) a coil 71 symmetrically disposed about a core 72, and a pair of electrodes 73 symmetrically disposed with respect to said coil and core, in a fixed position with respect to the strut 14. This enables the sensing unit 13 to maintain its symmetry with respect thereto under all conditions e.g. shock and vibration. The leads 74 to and from the sensing unit are also fixed within the plastic. After the casing has been filled, a streamlined plastic end piece 75 (Fig. 1) of chemically resistant water impervious material is fused to casing 15 to complete the strut unit.

From the above it may be seen that a rodmeter construction of substantially plastic materials has been provided which eliminates all magnetic materials, except for the core, thereby eliminating the problem of zero drift and errors due to eddy currents. The construction also enables the electromagnet and its lead wires to be precisely and fixedly located with respect to the electrodes and their lead wires. A further feature of the novel construction is apparent in that the strut may be removed and replaced by turning locking pins 36 and sliding the tie rods from within the coupling device 11. This operation will, at the same time, break the electrical connections also.

In accordance with the invention, Figs. 5 and 6 show a strut embodying a preferred hydrofoil shape and cross sectional profile. The cross sectional profile symmetrical about line 79 consists of an elliptical forebody 80 (from the leading edge 81 to its widest portion at 82) and a relatively longer streamlined tail portion 83, thereby combining the desirable characteristics of both forms i.e., an elliptical shape is superior to a streamlined shape as regards cavitation for both 2 and 3 dimensional forms while streamline shapes are superior as regards drag and eddy characteristics. The equations for the ellipse and parabolic streamline form are dependent on the size of the strut to be employed. In the embodiment shown the length (leading to trailing edge) to width ratio for the given length, delays the onset of cavitation and minimizes vibration of the strut along its vertical axis. Hence the body of revolution shown utilizes the high cavitation speed of the ellipse and the low drag of the streamline form.

While a strut as shown in Figs. 5 and 6 improved the hydrodynamic flow characteristics thereof, it was discovered that roughening the strut adjacent the leading edges of both sides thereof would induce turbulent flow at lower speeds and at the same time, with the shape shown in Figs. 5 and 6, delayed the onset of cavitation. Numerous methods of roughening the leading edges, such as embedding sand adjacent the leading edges, providing a blunt leading edge or grooving the strut at the leading edge are possible with the shape shown.

However, a preferred method of roughening superior to all other methods to achieve the object of the invention is depicted in Fig. 5 and in enlarged detail in Fig. 7. This method involves roughening the surfaces adjacent the leading edges 81 symmetrically about the electrodes 73 with a herringbone pattern 84. The herringbone pattern 84 (Fig. 7) comprises a plurality of rows of rectangular indentations 86 and 87, either machined or pressed in the plastic casing. The indentations in adjacent rows 86 and 87 are staggered and overlap, and as shown, make an angle of approximately 30° with a horizontal reference. The angle of the indentions in rows 86 being in a northeast direction and in adjacent rows 87 in a northwest direction such that the angle formed by two adjacent rows of indentations in substantially 60°.

It will be appreciated from the above that applicants have provided a rodmeter of novel design and construction whereby readings of an accuracy, not heretofore thought possible are obtainable over a whole operating range of speeds.

Fig. 8 in addition shows schematically a further improvement whereby the rodmeter 10 may be automatically positioned in line with maximum flow under a vessel to more accurately measure its speed relative to the water through which it travels. This positioning is accomplished through the provision of hydraulic orifices 90 on the port and starboard sides of the leading edge of the rodmeter 15. Any difference in pressure acting on the orifices 90 due to misalignment of the strut with respect to maximum flow will, as through suitable means 91 known to the art, actuate a servomotor 92 or the like to rotate the rodmeter and cancel out the pressure differential.

Fig. 9 schematically shows an alternative method for more accurately measuring a ship's speed when the rodmeter strut is not provided with means to align it in accordance with maximum flow. In this alternative method the rodmeter or sensing unit is provided with two sets of electrodes. One set 95 is placed along the leading and trailing edges of the rodmeter to measure speed transverse with the ship's keel. One set 96 is placed in normal position as previously described. The signals from both sets of electrodes are then fed to suitable means 97 for vectorially combining them to obtain an electrical output proportional to the magnitude and direction of the resultant vector. This output may then be fed to measuring circuits 98.

Obviously many other modifications and variations of the present invention are possible in the light of the above teachings. It is therefore to be understood, that within the scope of the appended claims, the invention may be practiced otherwise than as specifically described.

What is claimed is:

1. A rodmeter of the type described adapted to measure ship speed in water comprising a strut, said strut having an outer plastic casing formed of water impervious chemically inert material, means along and adjacent the leading edge of said strut to induce turbulent flow at low speeds, an electromagnetic sensing unit symmetrically disposed within said casing, and a plastic filler material within said casing, said plastic filler serving to maintain said sensing unit securely fixed in symmetrical relationship to the casing and to give said strut mechanical strength.

2. A rodmeter as recited in claim 1 wherein said means comprises a plurality of rows of indentations, the indentations in adjacent rows forming a roughened herringbone surface pattern.

3. A rodmeter for measuring water flow comprising a longitudinally extending strut mounted transversely to the water flow having an outer plastic casing formed of water impervious, chemically inert material, an electromagnetic sensing unit mounted within said casing comprising a longitudinally extending magnetic core extending in the same direction as said strut for projecting a magnetic field transverse to said water flow, a coil disposed about said core, and a pair of electrodes insulated from and symmetrically disposed about said core and coil and extending through casing for electrical contact with said water whereby the induced voltage of said water flow through said magnetic field may be measured, and a plastic filler within said casing to maintain said sensing unit securely fixed in symmetrical relationship to said casing and to give said strut mechanical strength.

References Cited in the file of this patent

UNITED STATES PATENTS

| | | |
|---|---|---|
| 2,404,281 | Eaton | July 16, 1946 |
| 2,435,043 | Lehde et al. | Jan. 27, 1948 |
| 2,529,658 | Massa | Nov. 14, 1950 |
| 2,583,724 | Broding | Jan. 29, 1952 |
| 2,709,979 | Bush et al. | June 7, 1955 |
| 2,771,771 | Kamp | Nov. 27, 1956 |

FOREIGN PATENTS

| | | |
|---|---|---|
| 699,939 | Great Britain | Nov. 18, 1953 |

OTHER REFERENCES

Article entitled—"The Measurement of Sea-Water Velocities by Electromagnetic Induction," by R. W. Guelke et al., The Journal of the Institution of Electrical Engineers, volume 94, parts 243, pub. date 1947, pages 71–74.

Article entitled—An Alternating Field Induction Flow Meter of High Sensitivity, by Alexander Kolin, The Review of Scientific Instruments, volume 16, number 5, dated May 1945, pages 109 thru 116 are pertinent.

Article entitled—A Method for Adjustment of the Zero Setting of an Electromagnetic Flow Meter Without Interruption of Flow, by Alexander Kolin, The Review of Scientific Instruments, volume 24, number 2, dated February 1953, pages 178 and 179 are pertinent.